United States Patent [19]

Head et al.

[11] 4,130,847
[45] Dec. 19, 1978

[54] CORROSION RESISTANT THIN FILM HEAD ASSEMBLY AND METHOD FOR MAKING

[75] Inventors: Nephi L. Head, San Jose; Robert D. Hempstead, Morgan Hill; Thomas N. Kennedy, San Jose; Fred Y. Lieu, Palo Alto, all of Calif.

[73] Assignee: International Business Machines Corporation, Armonk, N.Y.

[21] Appl. No.: 783,373

[22] Filed: Mar. 31, 1977

[51] Int. Cl.$^2$ .................. G11B 5/60; G11B 5/12; G11B 5/22; G11B 21/20
[52] U.S. Cl. ................................ 360/122; 360/103; 360/113
[58] Field of Search ........ 360/122, 125, 129, 102–103, 360/113, 130

[56] References Cited

U.S. PATENT DOCUMENTS

| | | | |
|---|---|---|---|
| 3,573,768 | 4/1971 | Harris | 360/103 |
| 3,665,436 | 5/1972 | Murray et al. | 360/122 |
| 3,823,416 | 7/1974 | Warner | 360/122 |
| 3,855,625 | 12/1974 | Garnier et al. | 360/103 |
| 3,887,945 | 6/1975 | Nepela et al. | 360/113 |
| 3,921,217 | 11/1975 | Thompson | 360/113 |
| 3,956,770 | 5/1976 | McWhinnie et al. | 360/103 |

Primary Examiner—Alfred H. Eddleman
Attorney, Agent, or Firm—James A. Pershon

[57] ABSTRACT

A slider element includes a thin film transducer deposited onto a slider along at least one of the rails forming the flying air bearing surface with a magnetic media. A portion of the end tips of the pole pieces and gap of the thin film inductive transducer and a portion of the slider rail adjacent to the transducer is etched by a sputter etching process. A layer of a passivation material such as chromium is sputter deposited into the etched portion such that the leading portion of the rail protects the passivation material from wear. The passivation material over the pole tips of the transducer prevents the corrosion of the iron-nickel alloy comprising the pole tips.

9 Claims, 4 Drawing Figures

CORROSION RESISTANT THIN FILM HEAD ASSEMBLY AND METHOD FOR MAKING

BACKGROUND OF THE INVENTION

This invention relates generally to a dynamic magnetic information storage retrieval apparatus and a method of making the apparatus, and in particular to a specific surface structure of a head assembly and a method of making a magnetic head assembly.

FIELD OF THE INVENTION

In the retrieval of dynamic magnetic information from a magnetic record carrier, a head apparatus comprises a slider for supporting a transducer element. The transducer element accomplishes the reading and writing of magnetic transitions onto and from the magnetizable material of the record carrier. The aim of the industry is to accomplish a higher density of magnetic transitions onto the media. To accomplish the higher density thinner pole tips and closer "flying" of the slider, and thereby the transducer, to the media is required. To accomplish the higher magnetic density, transducers comprising deposited magnetic material for pole tips, commonly called thin film transducers, are mounted onto the slider to support the transducer close to the magnetic media. The exposed pole tips corrode in the environment of the storage system. This corrosion causes the transducer to fail. An attempt was made to cover the entire air bearing surface and the pole tips of the head with a passivation layer. This caused a wear problem for the passivation material. The subsequent flaking of the passivation material caused a "head crash" which is a cumulative failing of the storage system as more and more debris is being generated as the head assembly flies over the magnetic media. A head crash can cause a complete destruction of the storage system along with the loss of information stored on the magnetic media.

It is, therefore, an object of the present invention to provide a head assembly including a slider and thin film transducer that is corrosion and wear resistant.

PRIOR ART

The prior art as represented by U.S. Pat. No. 3,665,436 and the British Pat. No. 776,348 disclose a passivation layer over the tip of a magnetic head to provide a wear resistant coating. The passivation layer does not cover the pole tip and gap area of the magnetic head. The prior art patents were concerned with the wearing of the generally soft magnetic ferrite material of the pole pieces. However, in the present day, the ceramic of the slider generally comprises a much higher wear resistant material to that of the passivation layer. Thus, the use of a passivation layer for wear, as taught by the prior art, is superfluous.

The deposition of a magnetic layer onto the bottom of a slider is shown in U.S. Pat. No. 3,573,768. The material deposition is at the front of the portion of the slider and is used to assist in obtaining a desired flying height and angle for the transducer located at the rear of the slider assembly. The material deposited on the air bearing surface of the slider does not cover the pole tips of the transducer.

It is, therefore, an object of the present invention to provide head assembly that includes a passivation layer covering the exposed portion, generally the pole tips and gap, of a thin film transducer and a portion of the slider to which the transducer is mounted, to thereby allow the forward portion of the slider to protect the passivation material from wear while the passivation material is providing a corrosion protection to the transducer.

In U.S. Pat. No. 3,921,217, assigned to the assignee of the present invention, the transducing magnetoresistive element is shown displaced from the surface of the head for wear protection. The magnetically permeable spacer element between the MR element and the media can be an electrically conductive or nonconductive material. The spacer element is deposited at the same level as the MR element. The patent does not disclose a means for protecting the inductive write pole pieces from corrosion. It is not the purpose nor is it contemplated by the patent that the spacer element can be used to protect the MR element from corrosion since the spacer element may be made of a Permalloy material. Further, it has been found that the spacer can not be a nonmagnetic material since then the transducing element must be placed so close to the media that a spacer deposited at the same layer level or deposited over only the transducer elements has to be of such a small volume as to not be capable of resisting much contact with the media without being dislodged.

It is also an object of the present invention to provide a head assembly that includes a transducer corrosion protection which is itself protected from wear.

SUMMARY OF THE INVENTION

In accordance with the present invention, a magnetic head assembly includes a transducer assembly arranged for sensing magnetic transitions from a media. The transducer assembly is attached to a slider which can be formed for creating an air bearing or contact bearing surface between the slider and the media. A portion of the transducer and the adjacent bearing surface of the slider is recessed from the bearing surface. A film layer of a passivation material is deposited into the recessed portion to protect the transducer assembly from corrosion. The transducer assembly is preferably fastened to the trailing edge of the slider. The recessing of the slider and transducer is preferably accomplished by sputter etching in a vacuum with the film layer of passivation material deposited by sputter deposition.

A method of making the head assembly comprising the steps of forming the slider from a wear resistant material with a transducer assembly fastened to the formed slider such that the transducer is in sensing relationship with the magnetic media when the slider is in intimate contact with the magnetic media. Preferably, the thin film transducer is formed by depositing the separate layers onto the slider or the slider material. A portion of the slider and the exposed end of the transducer are eroded to form a recessed area. A passivation material layer is then deposited into the recessed area to cover the entire transducer along with a portion of the slider at the bearing surface. In particular, the eroding step is formed by masking the slider assembly, except at the portion of the slider where the transducer is attached. The slider and transducer are then sputter etched in a vacuum. The passivation layer is then deposited in the same vacuum by sputter deposition and then the mask is removed from the slider.

Another object of the present invention, therefore, is to provide an enhanced head assembly and an enhanced method for making the head assembly.

Yet another object is to provide a head assembly comprising a thin film transducer fastened to a slider wherein a portion of the bearing surface of the slider and the exposed tips of the transducer are recessed and filled with a passivation material to protect the transducer from corrosion.

Still another object is to provide a method of making a magnetic head assembly including the slider and a thin film head by using a sputter etch and sputter deposition process to form a passivation layer that prevents corrosion of the transducer while the slider assembly provides wear protection for the passivation layer.

These and other objects of the present invention will become apparent to those skilled in the art as the description proceeds.

BRIEF DESCRIPTION OF THE DRAWING

The various novel features of this invention, along with the foregoing and other objects, as well as the invention itself both as to its organization and method of operation may be more fully understood from the following description of illustrated embodiments when read in conjunction with the accompanying drawings, wherein.

DESCRIPTION OF THE PREFERRED EMBODIMENTS

The present invention is preferably for use with flying magnetic transducer assemblies that start and stop in contact with a magnetic media. In order for the head assembly to "fly" over the media, an air bearing surface must be formed that permits the assembly to lift from the media as a result of relative motion and yet remain in intimate association therewith for reading and writing the magnetic transitions required for the storage of data information onto the magnetic media. In particular, the present invention is for use with a head assembly that starts and stops in contact. To start and stop in contact with the magnetic media, the air bearing surface of the assembly must have high wear resistance. But, the contact and the environment produces corrosion of the transducer assembly. However, passivation material to prevent corrosion does not have the wear resistance that is on the order of that of the material generally used in the manufacture of the sliders. To provide both wear resistance and corrosion resistance, the assembly as shown in the figures is employed.

Figure 1:
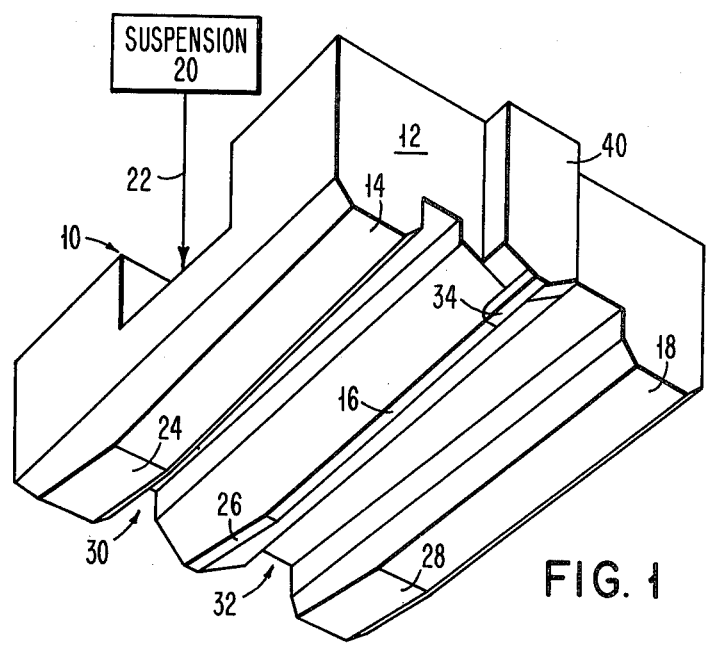
FIG. 1 illustrates a trirail slider with an attached transducer, both modified according to the present invention.

In FIG. 1 is disclosed a flying magnetic head assembly generally designated by the numeral 10 including a slider having three rails as disclosed in U.S. Pat. No. 3,823,416 issued to M. W. Warner and assigned to the assignee of the present invention. The head assembly 10 comprises a slider body 12 including three downwardly depending longitudinal rails 14, 16 and 18 that are laterally spaced apart. The bottom surface of the two outside rails 14 and 18 form an air bearing surface together with the center rail 16. A thin film transducer assembly 40 is fastened to a trailing side of the slider body 12 and is longitudinally aligned with the center rail 16. The transducer assembly 40 is located at the roll axis of the assembly 10 such that the air bearing developed during relative movement maintains the transducer assembly 40 at a substantially constant distance from the recording surface.

The slider body 12 and the thin film transducer assembly 40 are intrically bonded to one another. The head assembly 10 is attached to a suspension system illustrated diagramatically as 20 for maintaining the assembly in position on or above an associated magnetic media surface shown in FIG. 3. The head assembly 10 is loaded toward the media surface by a load means illustrated diagramatically as 22. The load means 22 is associated with the suspension system 20.

Figure 2:
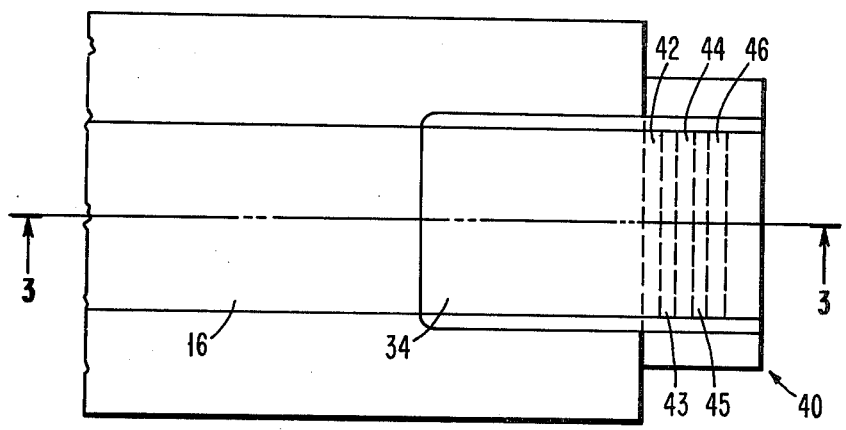
FIG. 2 is a close up bottom view of the rear portion of the center rail of FIG. 1.

The unitary slider body is preferably formed from a ceramic material such as alumina, baria titania or glass ceramic and includes the three downwardly depending longitudinal rails 14, 16 and 18 that are parallel to and coplaner with one another. Each rail has a taper-flat profile 24, 26 and 28 with the respective flat portion occurring in back of the leading edge taper portions, respectively. The outer rails 14 and 18 are located at the outer extremities of the slider body and are wider than the width of the center rail 16 so as to provide substantially the entire air bearing surface. The three rails are separated by bleed slots 30 and 32 which provide paths for undesired air to bleed off from the air bearing surfaces during a flying operation without contributing to the effective air bearing surface of the slider or changing the flying height. A passivation layer 34 is shown at the rear edge section of the slider assembly covering a portion of the slider 12 and the entire lower portion of the transducer assembly 40. The passivation layer 34 is preferably chromium and performs the function of changing the chemically active surface of the transducer assembly 40 to a much less reactive state. FIG. 2 shows a closeup of this portion of the head assembly.

Figure 3:
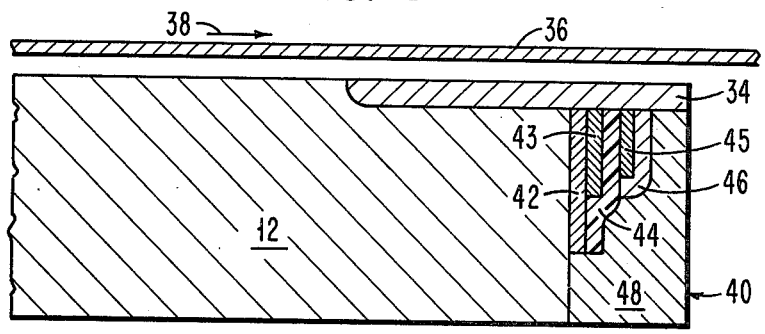
FIG. 3 is a sectional view taken along lines 3—3 of FIG. 2.

Referring to FIGS. 2 and 3, the transducer assembly 40 is shown attached to the rear or trailing side of the slider 12 and in sensing relationships with a magnetic recording media 36 traveling in the direction of the arrow 38, see FIG. 3. The transducer assembly 40 is preferably an inductive transducer. A thin film head usable as the transducer assembly 40 is disclosed in the IBM Technical Disclosure Bulletin entitled "Composite Read/Write Recording Head" by E. P. Valstyn, Vol. 14, No. 4, September 1971, at pages 1283–4.

Referring especially to FIG. 3, the transducer assembly comprises a first magnetic pole piece 42, a first electrical conductor 43, a second pole piece 44, a second electrical conductor 45, and a third pole piece 46. The first electrical conductor 43 activates the first and second pole pieces 42 and 44 to write a magnetic transition onto the media 36. The second and third pole pieces 44 and 46 create a read gap where the magnetic transition is read from the media 36 and become electrical pulses directed along conductor 45. The remaining section of the transducer assembly 40 is a cover protective layer 48 generally of a nonmagnetic, nonconductive material such as alumina to protect the working thin film portions of the transducer assembly 40.

The pole pieces 42, 44 and 46 are generally formed of a nickel-iron material, generally a Permalloy material. It has been found that the Permalloy material in the stop and start condition and atmosphere with the magnetic recording material can corrode which causes a failure of the transducer. The passivation layer 34 covers the entire working portion of the transducer together with a portion of the slider 12. A portion of the slider 12 is covered since it has been found that just depositing the passivation layer 34 onto the pole tip edges of the transducer assembly does not entirely cover the inside pole piece of the transducer assembly. The inside pole piece is normally directly attached to the slider assembly. Extra layers are sometimes added to the slider to prepare the slider, for example, for better adhesion of the first pole piece 42. These layers become part of the slider for purposes of this invention.

Any added layers formed onto the rear of the slider with the transducer assembly fastened to this extension is deemed to be covered by the present invention. For ease of discussion, the transducer assembly 40 is shown directly connected to the slider 12 and the passivation layer 34 covers both the rear portion of the slider 12 and at least the working portion, the pole pieces 42, 44 and 46 and gaps 43 and 44 of the transducer.

Figure 4:
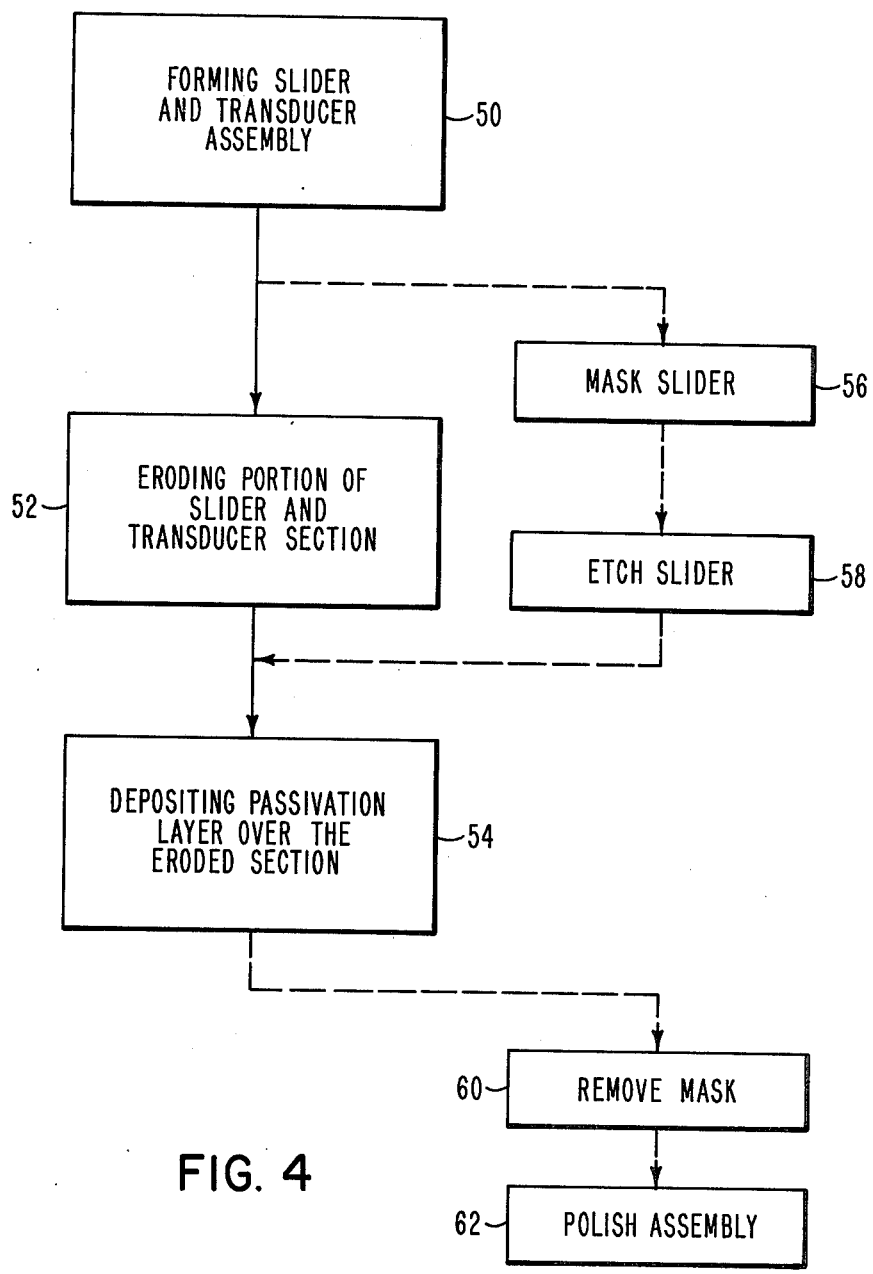
FIG. 4 shows the process steps for making a head assembly according to the present invention.

The method for making the head assembly according to the present invention is shown in FIG. 4. In the first step identified by the numeral 50, the basic head assembly, comprising the slider 12 and the transducer element 40 is formed. Batch processing for instance could be used wherein groups of transducers are deposited onto a substrate of slider material and then the sliders are blocked and shaped to form the air bearing surface. The slider could be formed as shown in FIG. 1 and discussed in the aforementioned U.S. Pat. No. 3,823,416. Batch processing is accomplished by depositing the transducer elements in steps by using the well known semiconductor processing steps to accomplish a thin film recording transducer. For instance, as discussed in the aforementioned publication "Composite Read/Write Recording Head" the first pole piece 42 of a magnetic film is deposited onto the nonmagnetic slider substrate 12. Then using known etching and masking techniques, the first electrical conductor 43 can be deposited on the magnetic films and an insulating layer (not shown) preferably of silicon-dioxide, is deposited on the conductor 43 and the pole piece 42. A second magnetic film is then deposited over each of the insulators for the second pole piece 44, thus creating a write gap between the two magnetic films. The second conductor 45 is selectively deposited over the second magnetic film and a third magnetic layer for the third pole piece 46 is deposited over the second conductor 45 thus creating a read gap between the second and third magnetic pole pieces. The back gap formed by the insulating layer in the write section of the head can be tolerated if the insulator is sufficiently thin compared with the height of the magnetic film over the first conductor 45. For further information of the transducer, reference is made to the aforementioned publication entitled "Composite Read/Write Recording Head."

The next step 52 in the process of FIG. 4 is eroding a portion of the slider assembly 12 and the transducer assembly 40. The last step 54 is the deposition of the passivation layer 34 over the eroded sections. According to the preferred embodiment, the eroding and depositing steps can be performed as shown in dotted lines in FIG. 4 by first (block 56) placing a mask over the formed slider element to cover the entire slider except for the portion of the slider 12 and the transducer assembly 40 that is to be covered by the passivation layer 34 as shown in FIG. 2. The slider 12 and the transducer assembly 40 is then placed into a sputtering vacuum deposition unit where the head assembly is subjected to a sputter etch process (block 58) to erode the rear portion of the slider 12 and the transducer section. The sputtering vacuum deposition system is then switched to deposit the passivation layer into the area just eroded as shown in block 54. Then the head assembly is removed from the sputtering system, the mask is removed by an acetone or developer (block 60), for instance, and the air bearing surface can be polished (block 62) to remove any excess mask material and to smooth the passivation layer for better flying characteristics.

The head assembly 10, according to the present invention, provides the corrosion protection over the transducer assembly in a manner not anticipated by the prior art. Attempts have been made to erode only the pole pieces and the gap of the transducer element without affecting the slider and the surrounding insulating layers such that the passivation layer only covers the end of the transducer but does not cover any portion of the slider. At present, there are no means for depositing a passivation material only over the extremely small dimensions of the thin film transducer. In order to keep the transducer assembly as close as possible to the magnetic media only an extremely thin layer, such as 10 microinches or less, can be removed to prevent an excessive degradation of the readback signals from the transducer element. Depositing a passivation layer covering such an extremely small volume as only the pole tips to a 10 microinch thickness is not possible at present without going through extremely costly procedures to selectively deposit the passivation layer to such a thin layer over such a small area. The procedure is especially a problem if the pole tips are recessed by selective etching and then an attempt is made to back fill by vacuum deposition. The passivation material generally must be lapped to remove the excess. This lapping step often will remove the entire passivation layer unless the head assembly is sputter etched and the passivation layer deposited as taught by the present invention.

The principles of the present invention have now been made clear in an illustrative embodiment. There will be immediately obvious to those skilled in the art many modifications of structure, arrangement, proportions, the elements, materials and components used in the practice of the invention. For instance, a magnetoresistive read head assembly could be used as the transducer assembly 40 such as disclosed in U.S. Pat. No. 3,887,945 entitled "Head Assembly for Recording and Reading, Employing Inductive and Magnetoristive Elements" and assigned to the same assignee as the present invention. Similarly a slider assembly such as disclosed in U.S. Pat. No. 3,855,625 entitled "Magnetic Head Slider Assembly" and assigned to the same assignee as the present invention may be substituted for the slider 12 as disclosed in FIG. 1. It is not meant by the discussion of a particular head assembly to limit the present invention to particular transducer or slider types. Further, many different passivation materials may be substituted for the chromium of the preferred embodiment. Rhodium and platinum are metallic substitutes. Alumina is a less desirable substitute.

Also, other eroding and depositing methods other than sputter etching and depositing may be used for the eroding and depositing steps of FIG. 4. An acid bath or a mechanical lapping process could be used as the eroding step, followed by an E-beam or resistance heating vapor deposition step. The appended claims are, therefore, intended to cover and embrace any such modification, within the limits only of the true spirit and scope of the invention.

We claim:

1. A magnetic head assembly comprising:
   a slider support having a bearing surface for close association with a magnetic media;
   a transducer assembly including at least one film magnetic layer and at least one electrically conductive film layer together with means to activate each conductive layer and having an active face for a transducing action with a magnetic transition from the magnetic media in relative movement therewith, said transducer assembly fastened to said slider support adjacent to its bearing surface, said transducer assembly and a portion of the bearing surface of said slider support adjacent to said transducer assembly being recessed; and
   a film layer of a passivation material covering the active face of said transducer assembly and the recess portion, said film layer being protected from excessive contact with the media by the unrecessed portion of the bearing surface of the slider support.

2. A magnetic head assembly as defined in claim 1 wherein said transducer assembly comprises a plurality of thin film magnetic layers and at least one electrically conductive layer together with means to activate each conductive layer to inductively drive said magnetic layers for transducing action with the magnetic media.

3. A magnetic head assembly as defined in claim 1 wherein said transducer assembly includes a magnetoresistive element to sense magnetic transitions from said magnetic media.

4. A magnetic head assembly as defined in claim 1 wherein said film layer of a passivation material is a layer of chromium.

5. A magnetic head assembly as defined in claim 1 wherein said slider support includes a plurality of rails forming an air bearing surface for flying said slider support in relation to the magnetic media, with said transducer assembly being longitudinally aligned with at least one of said rails.

6. A magnetic head assembly comprising:
   a slider body including downwardly depending longitudinal rails having bottom surfaces that are laterally spaced apart to form an air bearing surface;
   at least one transducer assembly including at least one thin film magnetic layer and at least one electrically conductive film layer together with means to activate each conductive layer and having an active face for transducing information upon a magnetic recording surface during relative movement therebetween and each longitudinally aligned with one rail and fastened at the trailing edge of said slider body, each transducer assembly and its associated rail portion adjacent to the active face of the transducer assembly being recessed from the air bearing surface; and
   a film layer of a passivation material covering each active face of the transducer assembly and its associated rail in the recessed portion, said film layer being protected from excessive contact with the media by the unrecessed portion of the air bearing surface.

7. A magnetic head assembly as defined in claim 6 wherein said transducer assembly comprises a plurality of thin film magnetic layers and at least one electrically conductive layer together with means to activate each conductive layer to inductively drive said magnetic layers for transducing action with the magnetic media.

8. A magnetic head assembly as defined in claim 6 wherein said transducer assembly includes a magnetoresistive element to sense magnetic transitions from said magnetic media.

9. A magnetic head assembly as defined in claim 6 wherein said film layer of a passivation material is a layer of chromium.

* * * * *